Feb. 20, 1968　　MASATOSHI SHIMADA　　3,370,179
SELECTIVE CALLING SYSTEM FOR RADIO RECEIVERS
Filed July 28, 1964　　　　　　　　　　　　　8 Sheets-Sheet 4

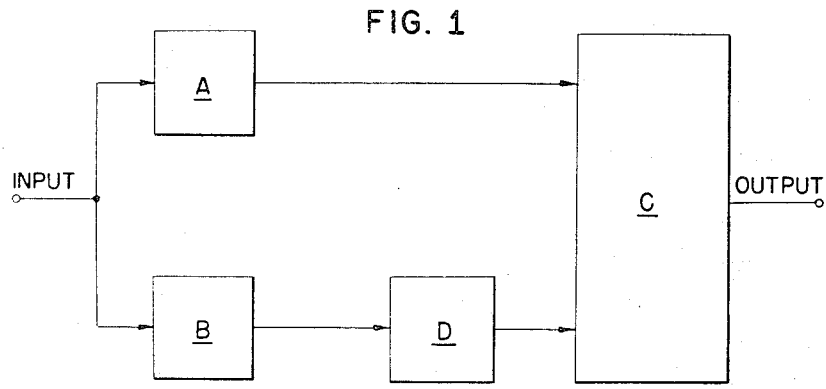
FIG. 1
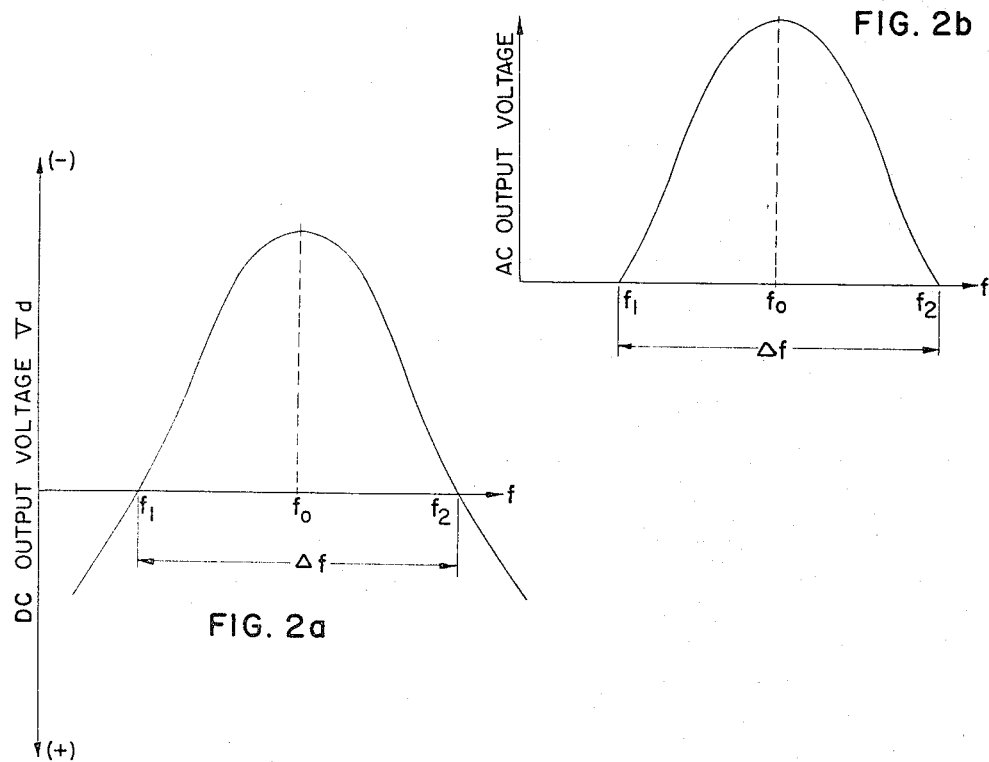
FIG. 2b
FIG. 2a
INVENTOR.
MASATOSHI SHIMADA
BY
AGENT

INVENTOR.
MASATOSHI SHIMADA
BY
AGENT

Feb. 20, 1968   MASATOSHI SHIMADA   3,370,179
SELECTIVE CALLING SYSTEM FOR RADIO RECEIVERS
Filed July 28, 1964   8 Sheets-Sheet 6

INVENTOR.
MASHTOSHI SHIMADA

BY

AGENT

Feb. 20, 1968 MASATOSHI SHIMADA 3,370,179
SELECTIVE CALLING SYSTEM FOR RADIO RECEIVERS
Filed July 28, 1964 8 Sheets-Sheet 7
FIG. 17
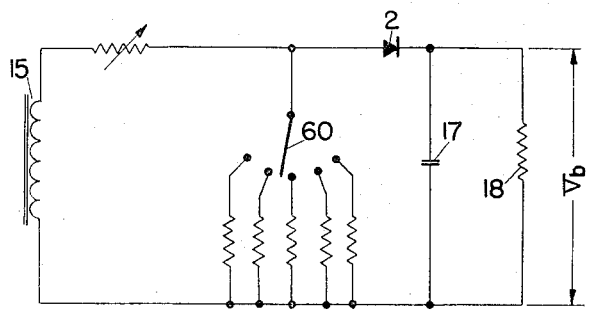
FIG. 18
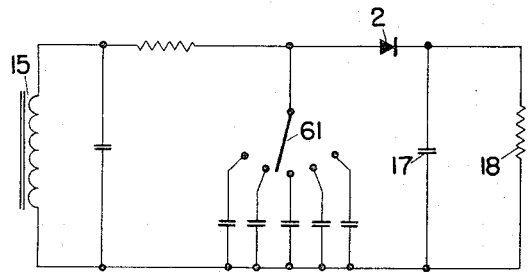
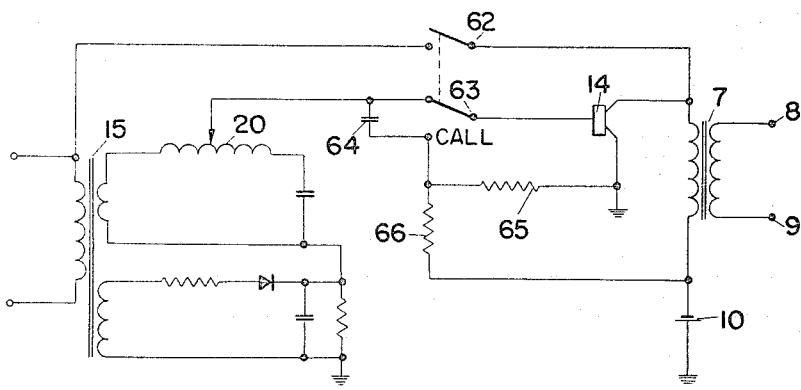
FIG. 19
INVENTOR.
MASATOSHI SHIMADA
BY
AGENT

United States Patent Office 3,370,179
Patented Feb. 20, 1968

3,370,179
SELECTIVE CALLING SYSTEM FOR
RADIO RECEIVERS
Masatoshi Shimada, 78 2-chome, Todorokimachi, Tamagawa Setagayaku, Tokyo, Japan
Filed July 28, 1964, Ser. No. 385,605
Claims priority, application Japan, July 30, 1963, 38/37,778; Nov. 7, 1963, 38/59,398; Jan. 18, 1964, 39/2,039; Jan. 30, 1964, 39/4,226; Apr. 13, 1964, 39/28,429, 39/28,430; Apr. 25, 1964, 39/23,397, 39/32,023
12 Claims. (Cl. 307—235)

ABSTRACT OF THE DISCLOSURE

A signal-receiving device having a pretuned resonant circuit controlling a switch circuit to provide an A.C. output whenever a signal is received within a narrow frequency band of the pretuned frequency. A delay system in parallel with the tuned circuit prevents D.C. transients from affecting the switching circuit. The device utilizes the actual received A.C. signal, after amplification, as the calling signal.

---

This invention relates to a signalling system, and, more particularly, to an improved signal selector capable of discriminating to select a signal for use in a selective calling system for voice frequency signals.

A known selector of this character for selecting said signal, such as a selector so-called differential type signal selector, employs a system that is capable of deriving a differential DC output from DC outputs provided by a tuned or untuned circuit A and a circuit B, such as proposed and described in U.S. patent application S.N. 249,517, filed Jan. 4, 1963 now U.S. Patent No. 3,284,673. In this known system, there are many advantages as compared with vibrating reed selectors, and this system is suitable for the use especially in small-sized apparatuses, for example in transceivers and the like, wherein considerable variation of a signal level and distortion are encountered. However, there are still such disadvantages that the selector of this known system requires considerable space and is expensive, is limited with respect to the number of available channels, varies a band width thereof depending on temperature, and derives a transient output at the moment of impressing of a signal, and further the system has been difficult for practical use.

An object of this invention is to provide a system that is capable of eliminating the aforesaid disadvantages, and such other disadvantages of the prior art which will now be described in detail.

As it has been described hereinabove, in the differential type signal selector, since an output is the difference between the outputs of the circuit A and the circuit B, when the output of the circuit B is increased and the band width thereof is decreased, the output of the selector may be decreased in proportion thereto. Therefore, for operating the signal detecting devices such as calling oscillators, relays and the like by utilizing the DC output, the derived output is not enough, and there is a need for amplifying said output. However, the output of the differential type signal selectors of the prior art have been all DC, this has not been suited for amplifying.

Another object of this invention is to provide an improved selector that is capable of eliminating the disadvantages of the prior art selectors, by converting the output of such selectors into AC for the practical use thereof. That is, if the output of the selector is AC, it may be possible to utilize this output as a calling signal by amplifying it directly. This means, for example, in transceivers and the like, that there will be no need of special relays, oscillators and the like for the purpose of calling up, and thus the selector may be arranged in compact and inexpensive construction. Further, in the selector of this character, it is impossible to make the apparatus free from malfunctioning resulting from voice frequency components, however, by arranging the apparatus in such way that the said signal can be monitored by amplifying a part thereof directly, and an operator can identify a calling tone according to whether it has been provided by the signal from the other operator or by the misoperation caused by the voice components.

Such AC output for discriminating the signal has the following advantages, that is, when the signal is within a given frequency band, it will provide an AC output, while for a signal outside of said band, there will be no output, or vice versa, if so desired and arranged. By this arrangement, the amplification of the signal may be made quite easily, or in this case, there will only be a need for the amplifier to amplify the properly present input signal because there is no need of consideration about stability, distortion and the like. Therefore, a limiting amplifier and the like may also be utilized for making the output thereof to be stable.

In the characteristic of such amplifier, attenuation against the signal outside the band is, theoretically, almost infinite, in contrast to that of the band pass filter which has been proposed heretofore. This is because that the primary object of the signal selector is to discriminate whether major parts of energy of an input signal exist within a pass band or not, and there is no need of transferring the wave form of the input signal to the output side with fidelity as is required in the conventional band pass filters, thus such special characteristic can be attained.

As it has been described herein before, if the band width is narrowed, there may be a low output. However, there are several methods to increase such output, for example, one of which methods is to increase an output of a resonant circuit contained in the circuit A. The difficulty in this method to increase the output is that if a large amount of output is derived from the resonant circuit, the Q of said circuit may be decreased and this may then cause an increase of the band width. Another method is to increase the input voltage to be applied to the resonant circuit, however, a ferrite core is generally provided in a coil of such resonant circuit for the purpose of increasing Q thereof, and one of the characteristics of such core is such that if an amount of magnetic flux passing through the core becomes too large, $\mu$ thereof may be changed. This means that the resonant frequency is changed by an input level, therefore this method is also undesirable. Further, in this method, if an airgap is to be provided with said core is widened for the purpose of minimizing the change of said $\mu$, such $\mu$ will be decreased, lowering said Q.

It is apparent from the aforesaid reasons that the most reasonable and economical method of increasing the output is to arrange the selector so as to derive an AC output and to make use thereof with direct amplification.

It is possible to amplify a DC output. However, in that case, the band width may vary at all times because of the effect of gain, stability, a source voltage and the like, of a DC amplifier. So it has not been provided in practical use.

As it has been described herein, the band width may be narrowed to any degree by way of converting the output of the selector into AC, and utilizing this output as amplified for accomplishing the purpose desired. However, it is difficult for the practical use only in accordance with this arrangement, this is because, accompanying with the reduction of the band width, the stability of other components such as coils, capacitors, transistors and the like exerts an influence upon the resonant frequency of the band width, therefore, as the band width becomes narrow in width, said influence increases in importance. The most important matter of the above is the change of a transistor characteristic by temperature. That is, such selectors are mostly utilized in conjunction with transistors, hence the change in the characteristic of the transistor by temperature may cause troubles, in case of controlling the transistor with the output of the selector for utilizing this transistor as a switching means or an amplifier.

Therefore, in this invention, such troubles are eliminated by way of providing a means for compensating for the change of base characteristic of the transistor due to temperature, and by applying a signal voltage on the transistor for the control thereof by means of a transformer so as to reduce a resistance to be connected to the base of said transistor.

An important problem next to the reduction of the selector band width, is the stability and accuracy of the capacitor for increasing the stability of the capacitor, as is well known, mica-capacitors, and in particular silvered mica capacitors may be utilized. By the use of these capacitors, historical change and change due to temperature are prevented. However, as the band width is reduced, there will be a need of utilizing capacitors that are more accurate in capacity, and this may then require the use of large and expensive capacitors. In the small-sized apparatuses or in transceivers and interphones wherein there are provided a number of signaling channels, a number of tuning capacitors are utilized. Therefore a means for arranging these capacitors to be small in size and inexpensive is a need for the practical use of those apparatuses. In this invention, based on the fact that respective frequency spacing between adjacent channels is considerably small as compared with the signal frequency, said problem is overcome by way of connecting small capacitors successively with a main capacitor in parallel. In the small-sized apparatuses, it is undesirable to provide the apparatus with special signaling oscillator for the purpose of calling up, and this oscillator makes the apparatus large in size and expensive. Therefore, it is desirable to employ a system that is capable of being operated as a signal selector at the time of receiving, and as a signal oscillator at the time of calling. As a feature of this invention, that problem has been solved by providing a resonant circuit in the selector with a feedback circuit from a front stage or back stage of amplifier for utilizing this as the signal oscillator by changeover.

In the differential type signal selector for deriving the difference between DC outputs of said two circuits, as has been described before, there is a problem that a transient output may be derived at a moment when the signal is impressed and at a moment when the signal is depressed, respectively, because of disparity of transfer characteristics between said two circuits.

That problem is eliminated in this invention by rectifying a part of energy of the input signal, applying this rectified output on a switching transistor and delaying switching action thereof for a small amount of time. The said problem may also be eliminated by another means, in which the DC output is increased only at a moment when the input signal is impressed.

Accordingly, the principal object of this invention is to provide an improved differential type signal selector.

Another object of this invention is to provide a differential type signal selector for deriving an AC output in accordance with a simple system.

Another object of this invention is to increase the number of channels available in the selector in accordance with a system having a high degree of reliability and capable of being arranged in compact and low-cost construction.

Still another object of this invention is to derive a ratio, betwen DC outputs from signals within a frequency band and outside that frequency band, to be theoretically infinite.

These and other objects and advantages of the invention will be apparent to those skilled in the art from a reading of the following description taken in conjunction with the accompanying drawings. These objects are attained by the apparatus of this invention, and as an example in one of the specific embodiments of this invention, an input signal is fed to two circuits of the different types named as circuits A and B for convenience, whereby an output of the circuit A is connected with a composing or combining circuit C and an output of the circuit B is fed to a rectifier D, and a DC output of said rectifier D is then fed to said circuit C, hence an AC output signal is derived from said circuit C. Further, a series or parallel resonant circuit is contained in either one of said circuits A and B. Therefore, the frequency characteristic of the signal selector arranged in said manner is such that the selector derives the AC output from the signal within a given frequency band, and no output from the signal outside said band, or vice versa.

In one specific embodiment of the composing circuit C, the output of circuit A is rectified to a DC voltage and the polarity thereof is made to be opposite to that of a voltage from the circuit D, and the voltages of circuits A and D are connected in series, either in total, or with a part of one component of either signal. The composite signal is then applied to a diode, or to a base of transistor, or to a grid of a vacuum tube. The diode or transistor or vacuum tube is so arranged that it becomes in operative condition only when the DC voltage is applied, while it is not operative and provides no output at the time of being impressed with only AC voltage. Thus, the signal output is derived from the secondary of the diode, the collector of the transistor or the plate of the vacuum tube.

In another embodiment of the circuit C, the AC output of circuit A and the DC voltage of circuit D are combined in series and applied to the diode, to the base of a transistor or to the grid of a vacuum tube, deriving an output from such diode or transistor or vacuum tube only when the peak value of the AC voltage exceeds the value of the DC voltage.

It is a general advantage of this invention, accordingly, that the output of the differential type signal selector is turned into AC instead of DC, and by the presence of this AC output, it is possible to discriminate and determine whether the major parts of signal energy are in a given frequency band or not.

Another advantage of this invention is to make infinite an output ratio of the selector derived from the signals within a frequency band and outside said band.

Another advantage of this invention is to have the circuit C for deriving an AC output from the AC output of circuit A and the DC output of circuit B.

Still another advantage of this invention is to prevent a transient output from generating, by increasing the DC voltage of circuit D only at a moment when the signal is applied.

A further advantage of this invention is to control a switching transistor by use of a DC output of a circuit E which is provided at the circuit B as a branch circuit.

A still further advantage of this invention is to utilize a temperature compensating element such as a thermistor, a diode or the like in a circuit betweenthe emitter and the base of a differential transistor in the circuit C.

Yet another advantage of this invention is to couple cumulatively small capacitors with a main capacitor, for changing a resonant frequency of a resonant circuit to be utilized in the circuit A or B.

A yet further advantage of this invention is to vary the constant of circuit B or D simultaneously with a change of channel frequencies.

Another advantage of this invention is to form an oscillator by providing a regenerative feed-back circuit preceding a front stage or following stage amplified of the selector to the resonant circuit circuit contained in the circuit A or B.

The invention will be dscribed in detail with reference to the accompanying drawings. In this application, the selector for deriving an AC output will be described, however, it is to be understood for those skilled in the are that this invention may easily be modified so as to be utilized in the system for deriving a DC output.

In the drawing,

FIG. 1 is a block diagram of a generalized system in which the invention is employed;

FIG. 2a is a graph of the frequency characteristic output of the system of FIG. 1 under one set of conditions; and FIG. 2b is a graph of the frequency characteristic output under certain other selected conditions of the circuitry;

FIG. 17 shows a circuit arrangement for controlling the amplitude of the output voltage by changing the resistor across which the voltage drop is to be utilized;

FIG. 18 shows a circuit arrangement for changing the frequency characteristics of the filter circuit;

FIG. 19 shows a modification of the basic system, wherein certain components may be utilized to serve also as an oscillator by use of a feed-back arrangement;

Figure 3:
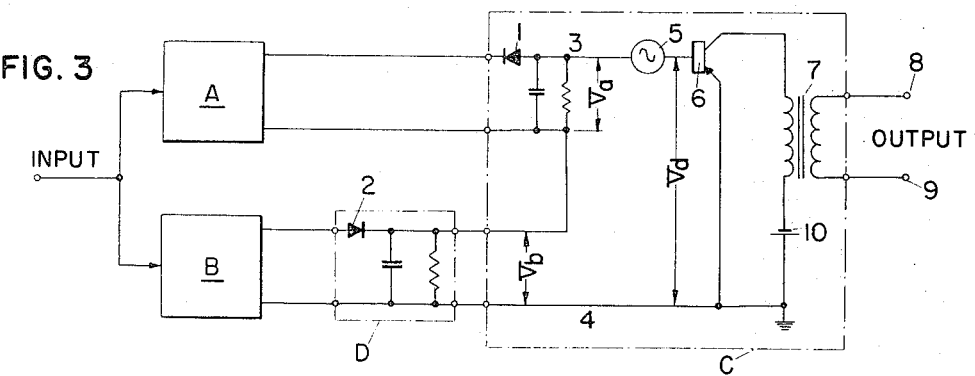
FIG. 3 is a diagram of one form of detail, combining circuit corresponding to FIG. 1 for obtaining output of FIG. 2a or 2b.

In FIG. 1, there is shown a specific embodiment of this invention in block diagram, wherein an input signal is branched to the circuits A and B, the AC output of circuit A is fed to the composing or combining circuit C, the output B is rectified to DC by means of the rectifier D, and this rectified DC voltage is then fed to the circuit C, deriving the AC output therefrom. The frequency characteristic of this embodiment is shown in FIG. 2b. To attain such characteristic, a series or parallel resonant circuit should be contained in either of the circuits A and B. There are various kinds of circuits that may be utilized as the circuit C, one of which is shown in FIG. 3, wherein the output of circuit A is rectified by diode 1, and this rectified DC output voltage $Va$ and the output vo'tage $Vb$ of circuit D with rectifier 2 are connected together with the polarity illustrated in FIG. 3 and fed to the base of transistor 6 in conjunction with a part of input signal 5, connecting an output transformer 7 and collector supply battery 10 with the collector of said transistor, hence deriving an output at terminals 8, 9 of the secondary of said transformer.

In this embodiment, if the resonant circuit is contained in the circuit A and not in the circuit B, the frequency characteristic of the differential voltage $Vd$ between terminals 3, 4 of FIG. 3 will be the one shown in FIG. 2a, and thereby the polarity of that voltage is inverted respectively at points where the frequency is $f_1$ and $f_2$. Therefore, when the voltage $Vd$ is negative, a base current will flow through the transistor 6, the signal 5 will be then amplified, deriving the output at the terminals 8, 9.

However, when the voltage $Vd$ becomes positive, the transistor will be cut off and there may be no output. Therefore, the frequency characteristic of this output may become the one shown in FIG. 2b. Accordingly, as is also described in detail in the aforementioned U.S. Patent application S.N. 249,517, filed Jan. 4, 1963 now Patent No. 3,284,673 the band width $\Delta f$ is not varied by an input level. It will be apparent from the above description that, even if the transistor 6 of FIG. 3 is replaced by a diode or a vacuum tube, the characteristic of FIG. 2b may be attained by selecting suitable polarity and working point for said voltage $Vd$. The signal 5 may also be derived from the input signal by means of a transformer, and the like, or may be picked up at the resonant circuit of the circuit A.

Figure 4:
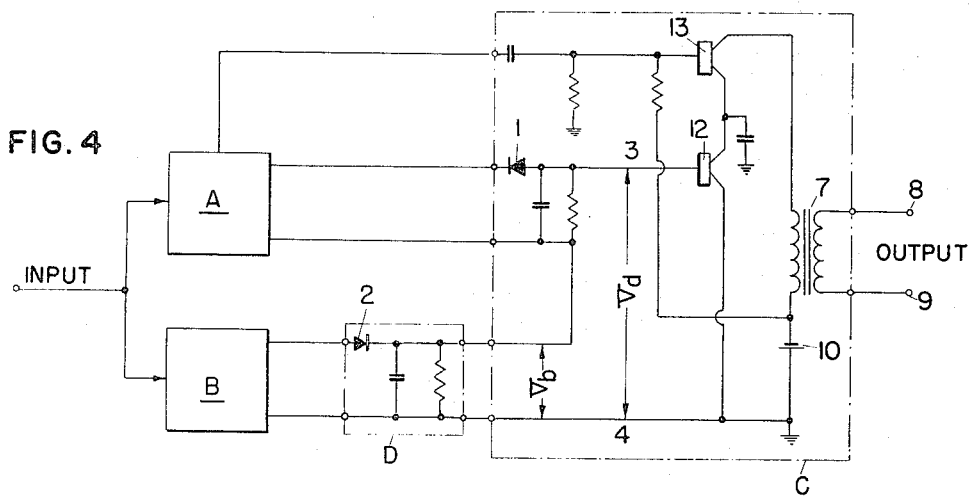
FIG. 4 is a diagram of a further combining circuit modification of the block diagram of FIG. 1 to obtain FIG. 2a or 2b as output.

Another specific embodiment of the circuit C is shown in FIG. 4, wherein the voltage $Vd$ is applied to the base of a switching transistor 12, which transistor 12 then provides switching action for a signal amplifier 13, and is turned into a condition of short circuit only when the voltage $Vd$ becomes negative and thereby the signal is amplified, the output of this circiut has the same characteristic as that of FIG. 2b. Such characteristic of the output may also be attained by switching the base voltage of transistor 13 or an AC output voltage at the collector side thereof by means of the transistor 12. In another way to attain such characteristic, a transmission line for the signal may be switched instead of switching the amplifier.

Figure 5:
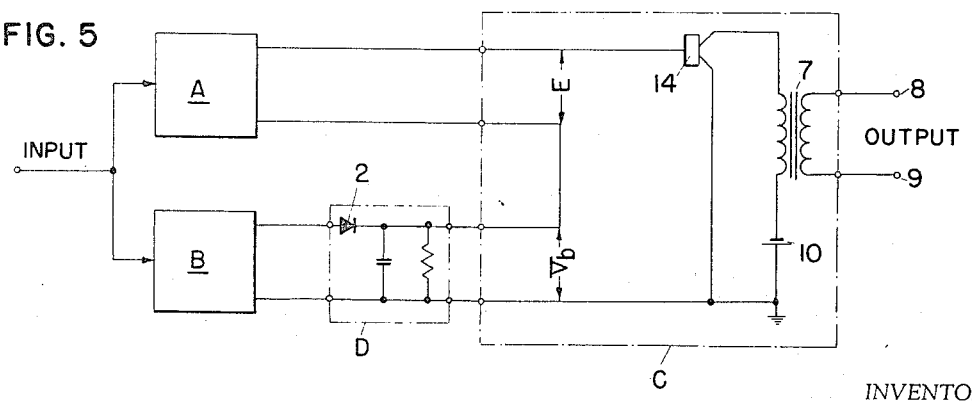
FIG. 5 is a diagram of still another arrangement of the combining circuit to obtain output of FIG. 2a or 2b.
Figure 6:
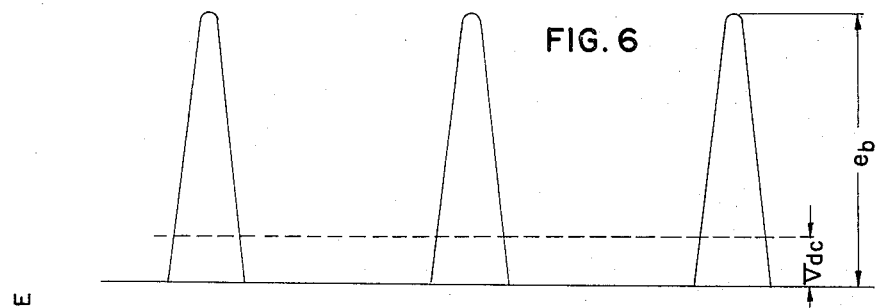
FIG. 6 is a graph showing pulse type outputs from the circuit of FIG. 5 under the differential voltage conditions indicated.

FIG. 5 shows another specific embodiment of this invention, wherein the characteristic of FIG. 2b may be attained by another simple method. That is, the AC output voltage E of the resonant circuit A and the DC voltage $Vb$ are combined in series and applied to the base of said transistor 14. By this arrangement, since the voltage $Vb$ acts as a biasing voltage for the transistor 14, a base current, as is shown in FIG. 6, may flow through only at a moment when the peak value $Ep$ of the AC voltage E exceeds the voltage $Vb$. This base current is then amplified, deriving an output at the terminals 8, 9. Therefore an output wave form may be in pulse shape like the one shown in FIG. 6, and it will be apparent from the above description that the frequency characteristic of the peak value of said output voltage becomes identical to that of FIG. 2b.

Since an object of this selector is to discriminate and detect the presence of the output energy and not to provide voice communications, there will be no problem with said wave form even if the output wave form is in pulse shape. The transistor 14 of FIG. 5 may be replaced by a diode or by a vacuum tube in accordance with the same reason that has been described in the description about FIG. 3.

Figure 7:
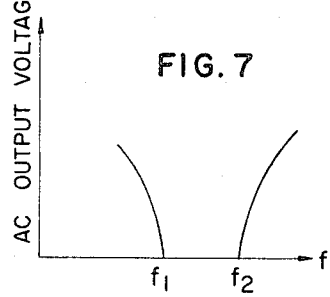
FIG. 7 shows schematically a frequency characteristic for a system in which a frequency suppression band is indicated, so there will be no transfer to the output of the system if the output signal is within such suppressed band.

There has been described above the system wherein the selector provides the AC output when the input signal is within the given frequency band $f_1$–$f_2$. However, if the characteristic is such as is shown in FIG. 7, there will be no output when the input signal is within said band, whilst the output is derived from the signal outside the said band. The system of this character may be utilized to provide the discrimination of the signal.

Figure 8:
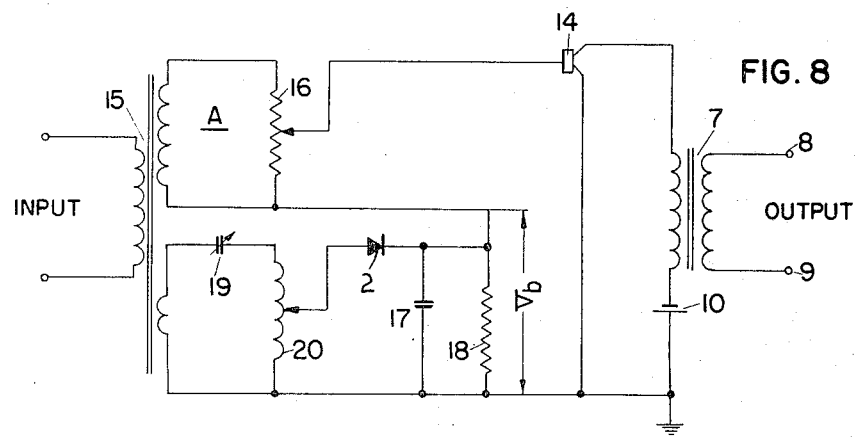
FIG. 8 is a diagram of a system for providing a band suppression characteristic as shown in FIG. 7.

Another embodiment of this invention is to provide the latter said characteristic as shown in FIG. 8, wherein 15 is a transformer for branching the signal and a resonant circuit comprising a tuning capacitor 19 and a coil 20 is utilized as the circuit B with output through diode 2 to filter capacitor 17 and output resistor 18. Therefore, the voltage $Vb$ increases rapidly at a point of the resonant frequency $f_0$, causing the transistor 14 to be cut off. When the voltage $Vb$ takes a small value, as when it has a frequency which is removed far from the resonant frequency $f_0$, the AC voltage of circiut A is passed through the transistor 14 and taken out as the output, the output characteristic whereof is shown in FIG. 7.

It will be apparent from the above description that the output characteristics shown in FIGS. 2b and 7 may be provided in various combinations of the characteristics of the circuits A and B, and this is quite similar to the case for deriving the DC output, such as described in the aforementioned U.S. patent application S.N. 249,517, now Patent No. 3,284,673. The circuit A or B may employ any of the series or parallel resonant circuits or a band pass or band elimination filter. Further, it will also be apparent from the above description and from the aforementioned U.S. patent application S.N. 249,517, now Patent No. 3,284,673, that, when a low pass filter is employed in the circiut B, it is posible to protect the variation of output level or bandwidth due to wave distortion, and therefore an amplitude limiter may be employed and the misoperation due to voice components may be eliminated.

By making AC of the output of the selector, as has been described and illustrated in the accompanying drawings, it is possible to amplify said output directly for making use thereof, and thereby the bandwidth may be reduced and the number of available channels is thus increased.

Yet, further, there is such advantage in this invention that, if a pulse voltage $e_b$ shown in FIG. 6 is rectified to DC, this will in turn become a value of $Vdc$ as it is shown by dotted line in said FIG. 6. This value is normally ⅕ to ⅒ the value of said voltage $e_b$, therefore, to obtain a DC voltage having the value of $e_b$, it is necessary to derive 25 to 100 times more power, in power ratio, from the resonant circuit than in the case of AC. However, in this case, the Q of the circuit will be decreased accordingly.

In the embodiment of this invention shown in FIG. 3, there will be a need of voltage $Va$ which is 5 to 10 times larger than the voltage to be atained as the DC output voltage $Vd$, and this in turn causes considerable loading effect on the resonant circuit, because the voltage $Vd$ is the difference between the voltages $Va$ and $Vb$, and for the purpose of reducing band width, only a small part or ⅕ to ⅒ the voltage of $Va$ becomes $Vd$. Owing to the aforementioned reasons, in the case of the system of FIG. 5, the loading effect on the resonant circuit may be neglected. Since the output is AC, said loading effect may further be decreased by way of utilizing the AC output being amplified. One of the reasons by which the system in accordance with this invention can have more the number of channels than those in the virbating reed selectors is based on the circuitry arrangements in the above mentioned description.

In such differential type signal selector of this invention, an input signal is branched to a plurality of circuits, and since the output provided by superposing the respective output of said circuits is utilized in the system, there will be caused a transient output at a time when the signal is impressed or depressed because of the difference between the transfer characteristics of said branch circuits. In the system wherein the difference between the DC outputs $Va$ and $Vb$ of circuits A and B is made for use, as in the case of the system of FIG. 3, there may be derived a DC output occasionally after the signal has been cut off, depending on the time constant of the rectifier circuit, such as in the aforementioned U.S. patent application S.N. 249,517. However, as in the case of this invention, if a part of the AC signal voltage and the DC voltage are superposed for making the use thereof, there will be no AC voltage at a moment when the signal is turned off. Therefore, even if the DC transient output is derived after the signal has been cut off, this will cause no trouble.

Figure 9:
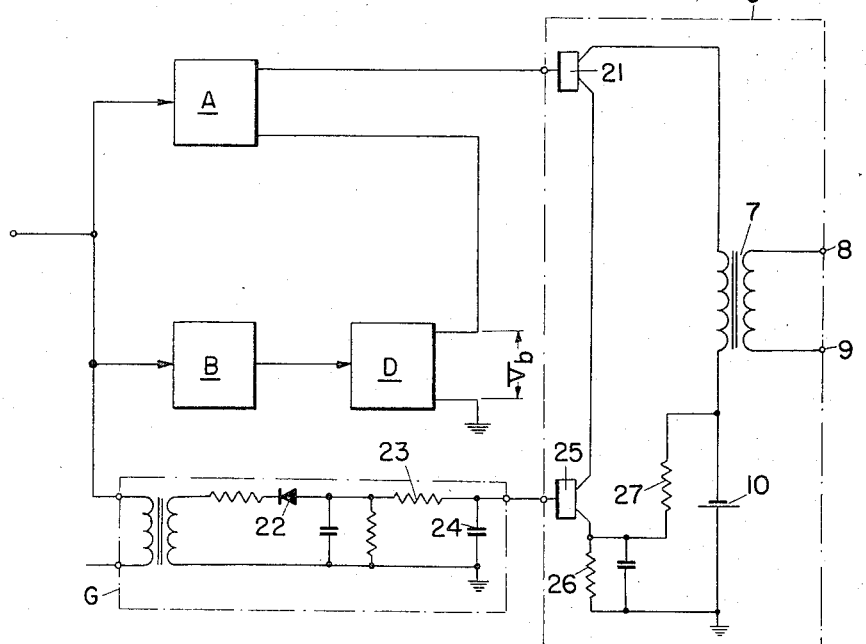
FIG. 9 is a diagrammatic circuit of a system modified to include a transient suppressing circuit to function at the instant when the signal is applied.

In FIG. 9, there is shown another embodiment of this invention for preventing the transient output from causing at a time when the signal is impressed, whereby a branch circuit G is provided in parallel with the circuit B, and the output of this barnch circuit G is rectified by a diode 22, this rectified DC voltage is then fed to a base of switching transistor 25 through a delay circuit 23, 24. Therefore, in this embodiment, even if the transient output is fed to a base of transistor 21 in a moment when the signal is applied, since the transistor 25 is in an open condition at this moment, no output may be derived at the terminals 8, 9, the transistor 25 thus becomes a short circuit with considerable small time lag. However, by this time, the output voltage $Vb$ of rectifier D will build up and the transient voltage being applied on the transistor 21 will be delayed. Therefore, by arranging the time constant of delay circuit in the circuit G for suitable time, the transient output may be prevented effectively. Further, in the embodiment of FIG. 9, it will be apparent from the above description that the transistor 21 may be replaced by the transistor 6 of FIG. 3 and the related circuitry, or may be utilized as an amplifier for the signel. Bias resistor 26 and connecting resistor are provided for transistor 25.

Figures 10A, 10B:
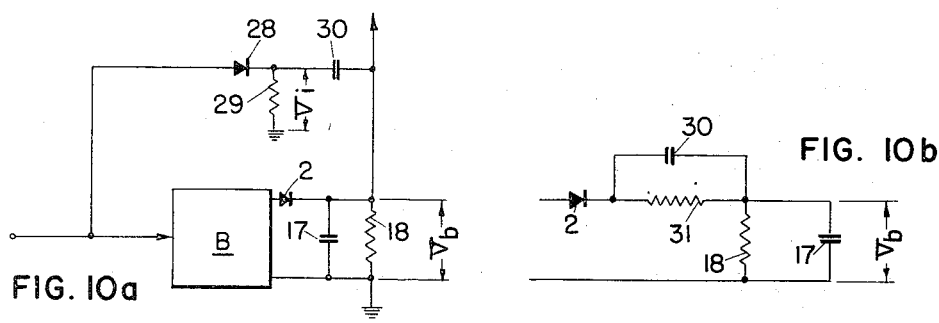
FIGS. 10a and 10b are partial circuit diagrams showing circuitry for suppressing transients by increasing a bias voltage when an input signal is applied.

In FIGS. 10a and 10b, there are shown other embodiments of this invention being arranged so as to prevent the transient output from developing, that is, by increasing the biasing voltage $Vb$ only at a moment when the signal is impressed, the build-up time of said $Vb$ is shortened. In FIG. 10a, a DC voltage $Vi$ which is larger than $Vb$ is impressed through a capacitor 30, and in FIG. 10b, a voltage drop across a resistor 31 is added to said $Vb$. In both cases, since the DC voltages are applied through capacitors, the increase of $Vb$ will be instantaneous and there will be no effect as a steady state. In this system, the build up time for apparent $Vb$ is shortened, therefore, it is difficult completely to prevent the transient output; however, it may be possible to minimize the transient output as much as suitable for practical usage.

As it has been shown in FIG. 3, if a voltage of the resonant circuit is utilized as the AC output 5 of circuit A, as the signal departs from the resonance frequency, said voltage may then be decreased; therefore, it may be possible to protect the transient output due to the signal being far off the band. According to this arrangement, not only the DC voltage $Vd$ but also the AC voltage 5 may vary their value depending on the frequencies, providing another advantage such that selectivity of the selector is sharpened.

In order to provide the narrow band width such as described herein above, it is necessary to compensate for the variation being caused by the change of temperature in the transistor, as in the nature of a transistor, a leakage current flows through from the base to the collector thereof, and this may increase as the temperature rises. Therefore, if there exists a resistance between the emitter and the base of the transistor, this will cause a DC voltage drop, and a base current will then flow through the transistor because of said voltage drop. Several examples of this DC drop are shown by the following table, wherein a base load is 10 kilohms.

| | |
|---|---|
| 27° C. | 0.09 V |
| 40° C. | 0.15 V |
| 50° C. | 0.20 V |
| 55° C. | 0.27 V |

An example of working voltage at each part of the selector will be: in a normal temperature as in the case of the circuit of FIG. 5, $E_p$=2.2 $V$ and $Vb$=2 $V$, respectively. The difference voltage of 0.2 V between said voltages is thus applied on the base of transistor 14. Therefore, the fact that the base voltage varies in accordance with the change of temperature, as it is shown in the above table, means the variation of $Vb$, so that the variation of band width is several times as large as would be without compensation. Hence the selector will not be practicable. A suitable compensation thus becomes necessary, however, in this system, as it is apparent from the drawings, since a cut off point of the transistor is utilized and there is no working voltage being fed from an outer circuit, a conventional temperature compensating means such as utilized in a normal amplifier may not be utilized.

Figure 11:
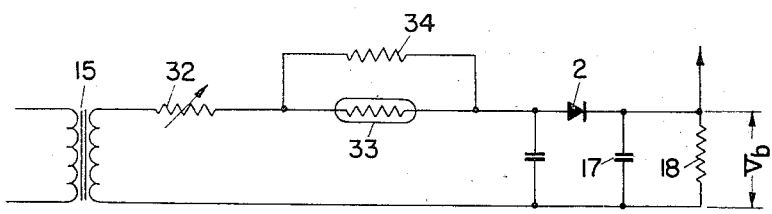
FIG. 11 shows a portion of the system of this invention, in which a temperature-compensation features is provided by the operation of a transistor.

In FIG. 11, there is shown a specific embodiment of this invention, wherein the temperature compensation is provided. This drawing illustrates only the circuit B and rest of the circuits are not shown, for simplicity. Referring to this FIG. 11, which is so arranged that the voltage $Vb$ is increased in accordance with temperature rise by making use of a characteristic that the resistance of thermistor 33 is decreased as the temperature rises, a resistor 34 is provided for preventing the resistance of said thermistor from excessive increase at low temperature. By arranging the respective constant at suitable value, it is possible to protect the effect of temperature for practical use in such a manner as increasing the value of $Vb$ that corresponds to the variation of cut off point of the transistor 14 caused by the temperature rise.

Figure 12:
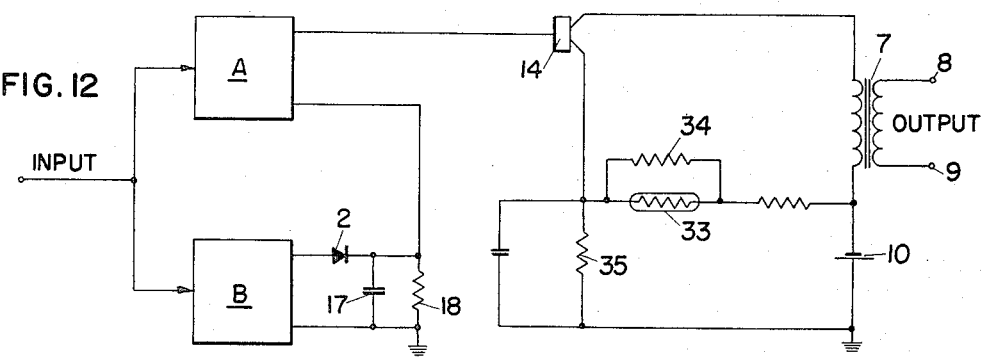
FIG. 12 shows a modified system of the invention, in which a temperature compensation feature is provided by varying the bias on the emitter of a transistor.

In FIG. 12, there is shown another embodiment of the invention for providing the temperature compensation, whereby a biasing voltage of the emitter of transistor 14 is increased in accordance with the temperature rise.

Figure 13:
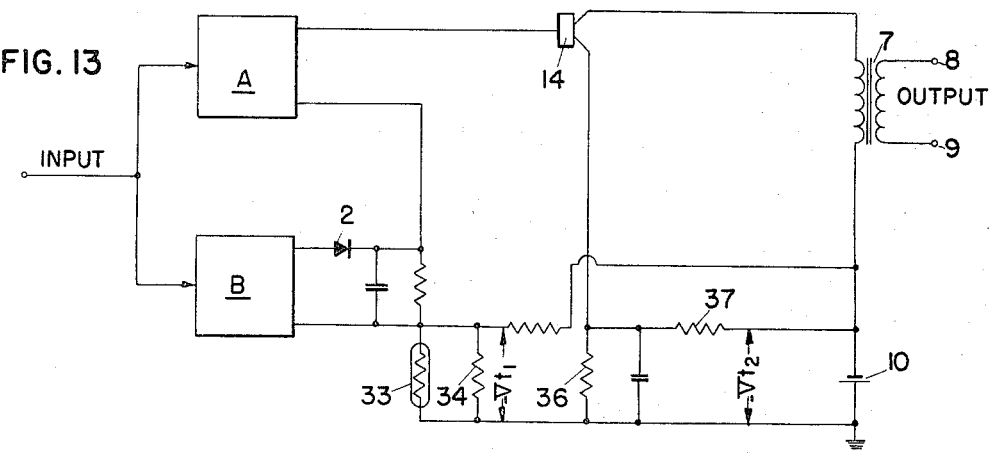
FIG. 13 shows another modified circuit for introducing temperature compensation.

Further, FIG. 13 shows another method for the temperature compensation, whereby, if voltages $-Vt1$ and $-Vt2$ having almost the same value, in a normal temperature, are applied on the emitter and the base of transistor 14, there will be no change in the cut off point of the base. However, the resistance of thermistor 33 is decreased in accordance with the temperature rise, decreasing the base voltage, which then compensates the movement of said cut off point for the base due to temperature, such as is shown in the above table. In the above case, the voltages $Vt$ are not necessarily required to be exactly the same in value, and even if there is small difference between said voltages, this may be easily compensated by adjusting $Vb$. Bias resistor 36 and connecting resistor 37 are here provided for transistor 14.

It is to be understood that other characteristics, such as between each electrodes of a transistor, the back resistance of a diode and the like that is capable of varying the resistance thereof in accordance with the change of temperature, as well as the thermistor described above may be utilized to accomplish said temperature compensation. The change of characteristic of the transistor that has been described herein may occur at the instant of controlling the switching transistor by way of amplifying the DC or AC output of the selector for the use thereof, or when operating a relay and the like by utilizing the collector current of the transistor.

However, when the output of the selector is AC as in the case of this invention, the signal may be fed to the base of transistor by means of a transformer. Therefore, by selecting the DC resistance of the secondary winding of said transformer to be small, the aforementioned characteristic change of the transistor caused by the change of temperature can be prevented thoroughly.

It is difficult to prevent completely the change of characteristic due to the change of temperature, however, even though the temperature compensation is carried out in accordance with the aforesaid method. In one of the examples wherein compensation error of 20% exists, as in the case of the circuit of FIG. 5, where $Ep$=2.2$V$, $Vb$=2.0$V$, thus making $Eb$=0.2$V$, the compensation error will be 0.2$V$×20/100=0.04$V$. However, if $e_b$ is converted to DC, as is in the case of FIG. 6, the voltage thereof will be approximately ⅕ of said $e_b$ or 0.04V, and this value is the same as that of said temperature compensation error, therefore this is not suited for practical usage.

Thus, in order to control the transistor by utilizing the DC output, it is necessary to utilize a voltage five times larger than said output, but this inevitably increases the loading effect and decreases the Q of the circuit. However, by applying AC, more specifically a pulse voltage on the base of the transistor, it is possible to minimize the effect due to the variation of the characteristic caused by the change of temperature.

If a diode is utilized instead of the transistor 6 of FIG. 3, or the transistor 14 of FIG. 5, there will be no change in temperature characteristic as it has been considered in the transistor. However, in this case, there arise different problems, such that ripples of the AC voltage E or $Vb$ may be leaked to the output of a diode, with the increase of temperature or humidity, even if the diode is kept in a cut off state by means of the biasing voltage $Vb$. Since the AC voltage E has 5 to 10 times the value of the differential output voltage $Vb$, the said leakage may not be neglected according to the circumstances.

Figure 14:
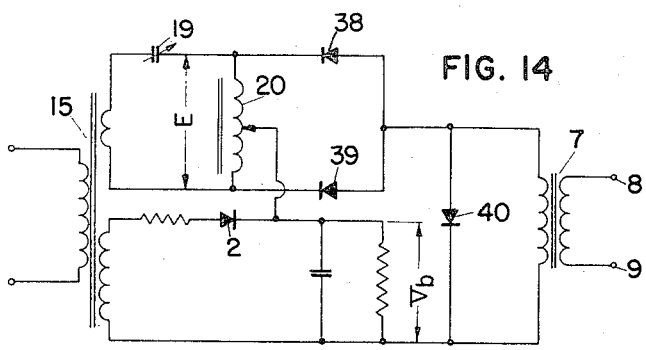
FIG. 14 shows a circuit arrangement for suppressing ripple effects.

In FIG. 14, there is shown another embodiment of this invention, wherein such effect is eliminated, and thereby the leakage current is balanced out by means of diodes 38, 39 and the ripples of $Vb$ are short circuited by means of a diode 40. Since the diode 40 has opposite polarity relative to the output signal, there will be no attenuation in the output signal caused by this diode 40.

In the case of providing such selector as has been illustrated above for practical use, there may arise a need for providing a number of channel frequencies according to circumstances, and for making use of those frequencies by changing as the case may be. Under such circumstances, if, for example, the vibrating reed selector is provided for each channel, this may require a calling oscillator, and the selector becomes large in size and expensive. Therefore such arrangement has never been used in transceivers, interphones and the like.

Figure 15:
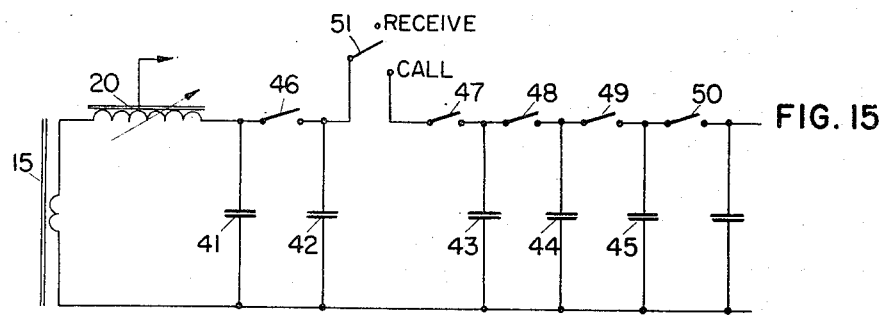
FIG. 15 shows a schematic diagram of a circuit arrangement for variably turning the resonant circuit employed in the system.

It is also another object of this invention to eliminate such difficulties experienced in the above arrangement. In FIG. 15, there is shown another embodiment of this invention, wherein is illustrated only a resonant circuit, to be contained in the circuit A or B and the rest of the circuits are not shown, for the purpose of simplicity. In such case as the resonant circuit is a single tuned circuit, the resonant frequency thereof can be varied easily by utilizing tuning capacitors with switches. However, there will be a need for utilizing accurate tuning capacitors according to the resonant frequency as the band width becomes narrow. Therefore the use of a number of capacitors which are less in error and less in variation due to temperature makes the selector so large in volume and so expensive that they can not be afforded for use in the small-sized apparatus such as transceivers.

The embodiment of FIG. 15 is provided for eliminating such difficulties described above, wherein 20 is a tuning coil, 41 is a main capacitor, 42, 43, 44, . . . are capacitors each of which has small capacity, 46, 47, 48, . . . are switches and 51 is a switch for providing switching for call and receive. The reason for the use of such capacitors with small capacity, as in the case of the circuit of FIG. 15, is that, in order to provide a number of signal channels, which is an object of this invention, the frequency spacing between adjacent channels may become small as compared to the channel frequency, and thus the channel frequency can be changed easily by adding small capacity. This means, as in the case of the circuit of FIG. 15, that a receiving or oscillating frequency can be determined by a sum of capacitors being added to the main capacitor by operating said switches. There are many advantages in that arrangement, wherein the small capacitors are connected cumulatively with the main capacitor, in order that, since the capacity of each small capacitor is generally approximately $\frac{1}{10}$ the capacity of the main capacitor 41, it will be possible to tune the resonant frequency, based on the members 20 and 41, with good accuracy by adjusting the tuning coil 20 even if there is a capacity error in the said main capacitor 41. Next, in the case of generating a channel frequency next in sequence by adding the small capacitor 42, since the capacity of said capacitor 42 is approximately $\frac{1}{10}$ the value of the main capacitor, the capacity error for the small capacitor that may be allowed is approximately to the extent of ten times as large as that of the main capacitor. This means that capacitors having comparatively large error may be utilized as the main capacitor and as the small capacitors, respectively. Furthermore, the capacitors having small capacity are small in size and inexpensive, and therefore they are suitable for use in the small-sized apparatus judging from the size and cost thereof. In case of utilizing this in the transceivers and the like, in which a receiving frequency is constant whilst an oscillating frequency may be changed, depending on who is to be called, it is possible to utilize nonlocking switches such as calling switches 46, 47, 48, . . . ., as are shown in FIG. 15, and to arrange a calling switch 51 in such a manner that the switch is returned to its original position automatically after the completion of calling operation so as to open the capacitor coupled circuit, thereby making it convenient for practical use. It is possible to add the small capacitors by utilizing a rotary switch instead of the series line switches illustrated in FIG. 15. Further, the switch 51 may be replaced by a hock switch in the case of interphones, and by a part of a press-talk switch in the case of transceivers. It is convenient that the receiving channel frequency is changed freely in the case of transceivers.

Figure 16:
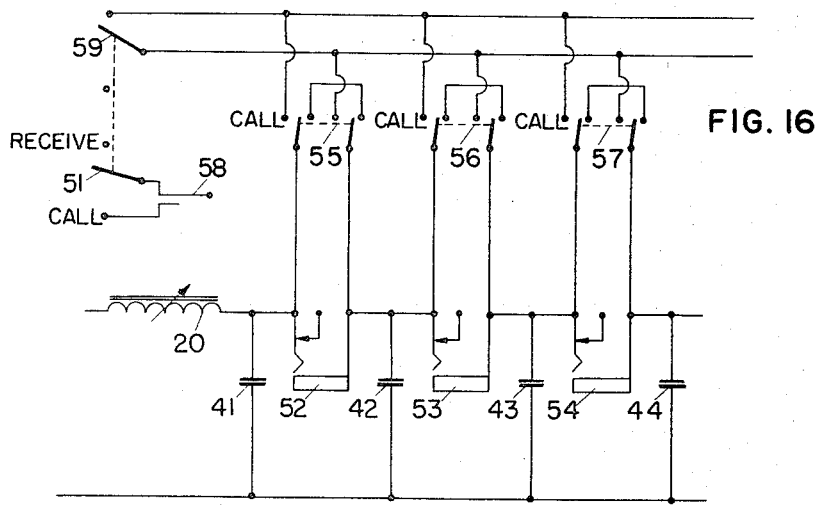
FIG. 16 is a schematic diagram of a circuit arrangement utilizing plugs and jacks for varying or selecting different frequencies.

In FIG. 16, there is shown another embodiment of this invention, so arranged that the calling and the receiving frequencies may be changed independently, wherein the insertion of a plug 58 into any of jacks 52, 53, . . . which is determined by receiving frequencies, corresponds to the operation of the switch 51 of FIG. 15, and the calling channel may be determined by changing any one of calling switches 55, 56, 57, . . . over to the call side and by operating a gang switch 59 for forming a calling circuit by means of a suitable relay circuit.

The switching operations of the plug 58 and jacks 52, 53, . . . may also be carried out by utilizing keys. If there is need for more channels than those attained in accordance with the aforementioned method, a frequency range may be changed in accordance with a well known method wherein a tuning coil or taps thereof are changed over or varied or wherein a capacitor is connected in series with the coil 20 and which capacitor is then varied. If the channel frequency is changed in such manner, the Q of the resonant circuit may vary, and therefore the circuit A may vary the output thereof. Therefore there may be a need for changing the DC output Vb of circuit D simultaneously with the change-over in the channels.

In FIG. 17 there is shown an embodiment of the invention, wherein the voltage Vb is changed in value by means of a switch 60 which interlocks with the channel change-over switch, and there is shown an example of changing the AC voltage, however the DC circuit may also be changed over. As it has been described herein and is described in the aforementioned U.S. patent application Ser. No. 249,517, now Patent No. 3,284,673, if a low pass filter is utilized in the circuit B, the characteristic of the circuit B will become unsuitable for the operation in accordance with the change of frequency.

In FIG. 18 there is shown another embodiment of this invention which is so arranged that the characteristic of the low pass filter in the circuit B is changed by means of a switch 61 which interlocks with switches provided for changing over to different channel frequencies. As it has been described hereinbefore, in the small-sized apparatus such as transceivers and the like, it makes such apparatus large in size and expensive to furnish the calling oscillator and the selector. However, since the selector according to this invention contains the resonant circuit, a calling oscillator may be provided by use of said resonant circuit. Therefore, there may be no need of another calling oscillator. This is one of the important reasons that the transceiver, the interphone, etc., in which the selective calling system herein is utilized, may be provided for practical use.

In FIG. 19, there is shown another embodiment of the invention for utilizing the selector as an oscillator. Since one of the advantages of this invention is that the output of the selector is AC, the selector is turned into an oscillator easily by providing a regenerative feed back circuit, from the amplifier provided at the following stage of the selector, to the resonant circuit. FIG. 19 is an example of such arrangement, whereby the selector of FIG. 5, here employed, is also turned into an oscillator. In order to utilize the differential transistor 14 of FIG. 5 for the oscillator operation, it is necessary to feed a working base voltage thereto. That is done in FIG. 19, wherein switches 62, 63 are interlocked and serve to form the feed back circuit as well as to provide the base voltage.

In case of employing a selective calling system in the transceivers and the like, it is necessary that the selector should be small in size and inexpensive. For this purpose, it is desirable to utilize the existing device as far as possible and to minimize the number of parts to be added. On the other hand, in portable transceivers, it is important to minimize the number of control buttons as much as practicable for simplifying the operation of the apparatus.

Figure 20:
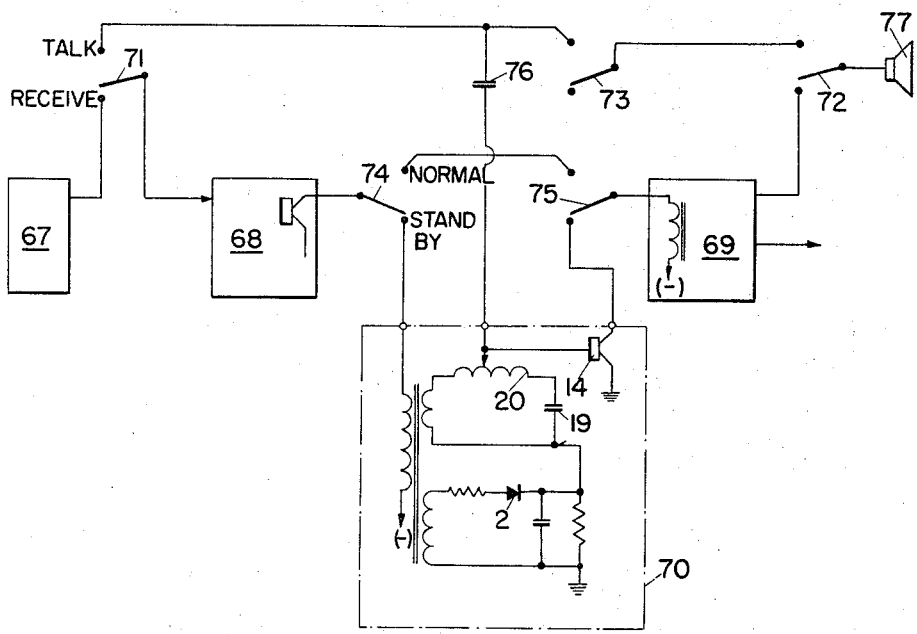
FIGS. 20 and 21 show modified circuit arrangements for providing the feed-back feature.
Figure 21:
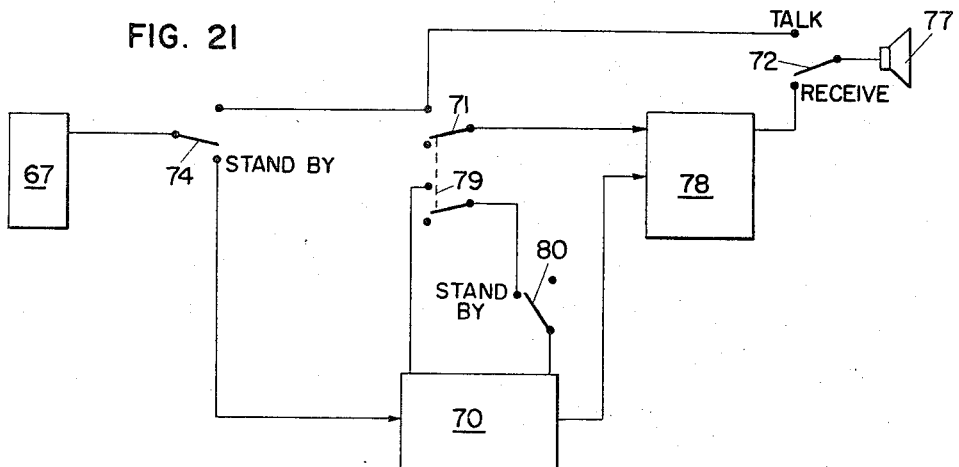

In FIGS. 20, 21, there are shown other embodiments of this invention, wherein the number of operating buttons is minimized by the arrangement for providing the regenerative feed back circuit with the use of the press-talk switch. Block 67 indicates a high frequency part in the case of transcievers, and an input amplifier in the case of interphones, 68 and 69 are existing amplifiers, 70 is the selector according to this invention, 71 and 72 are press-talk switches and 74, 75 are interlocked switches for inserting the selector 70 between the L.F. amplifiers 68 and 69. When the switches 74, 75 are positioned at their stand-by lower positions, the selector may be inserted between the said L.F. amplifiers 68 and 69 and only when there is a calling signal from the other operator will a speaker 77 be operated. In a stand-by state, if the press-talk switches 71 and 72 are changed over to upper talk positions, the regenerative feed back circuit will be formed by the capacitor 76 and the switch 71, hence the output of the oscillator will then be transmitted through the L.F. amplifier 69. If the switches 74, 75 are positioned at their normal upper positions, a conversation may be had by operating the press-talk switches 71 and 72. The operations of these switches are the same as that of the conventional device, therefore no explanation need be made herein. Referring to these figures, the switch 73 intelocks with the switches 74, 75 and is provided for preventing the speaker, with its low impedance, from coupling in parallel with said feed back circuit.

Since the selector according to this invention has the advantage that the output thereof is AC, it is possible to utilize the existing amplifiers both in receiving and calling, and further to minimize the apparatus in size and cost.

In FIG. 21, there is shown another embodiment of this invention, wherein the preceding or front stage L.F. amplifier has been omitted, and in which 79, 71, 72 are interlocking press-talk switches, 74, 80 are interlocking stand-by switches and 78 is a L.F. amplifier. In this case, the regenerative feed back circuit is formed by means of the switch 79. The switch 80 is for preventing the selector from oscillating by use of the press-talk switch in the case of being at normal state, and the rest of the operation will be the same as that of FIG. 20, therefore no further explanation is needed.

What is claimed is:
1. A signal-receiving device comprising:
   an input signal-receiving circuit;
   a first branch circuit connected to be energized from said signal-receiving circuit and to provide a first output voltage;
   a second branch circuit connected to be energized from said signal-receiving circuit and including a resonant circuit arrangement providing a frequency selective output; and
   a switching circuit means which is enabled in response to the application thereto of said frequency selective output to pass said first output voltage through said switching circuit.
2. A signal device as in claim 1 wherein said first branch circuit is connected to said resonant circuit arrangement contained in said second branch circuit and thereby derives said first output voltage.
3. A signal-receiving device as in claim 1 further including rectifier means wherein said second branch circuit comprises both said rectifier means and said resonant circuit arrangement within the same circuit.
4. A signal-receiving device as in claim 1 further including rectifier means, said second branch circuit further comprising two circuits A and B in which said circuit A includes said resonant circuit arrangement providing said frequency selective output and said circuit B includes said rectifier means providing a D.C. output voltage; and wherein said switching circuit means comprises a combining circuit whereby said frequency selective output and said D.C. output are combined into a differential output.
5. A signal-receiving device as in claim 4 wherein said combining circuit further includes:
   an electron control device having an electron path, a control electrode and an output electrode, said differential output being applied to said control electrode; and further including
   an electroresponsive device connected to said output electrode providing a frequency selective A.C. output.
6. A signal-receiving device as in claim 4 wherein said circuit B further includes trasnient control means whereby said D.C. output voltage is increased only at the moment when a signal is received.
7. A signal-receiving device as in claim 1 wherein said switching circuit means includes an electron control device having an electron path, a control electrode and an output electrode.
8. A signal-receiving device as in claim 7 in which said electron control device is a transistor having an emitter electrode and a base electrode with a bias circuit therebetween, and further including temperature compensating means controlling said bias circuit whereby compensation temperature for variations of said transistor is provided.
9. A signal-receiving device as in claim 7 wherein said frequency selective output is connected to said control electrode of said electron control device, and further including a transmission path for said first output voltage controlled by said electron control device.
10. A signal-receiving device as in claim 7 further comprising:
    a transistor amplifier;
    said frequency selective output connected to said control electrode of said electron control device;
    said first output voltage connected to said transistor amplifier;
    means including said transistor amplifier device controlling said electron control device; and
    a delay circuit means included in said first branch circuit whereby transient effects of said second branch circuit are eliminated.
11. A signal-receiving device as in claim 7 further including:
    a transistor amplifier;
    circuit means connecting said first output voltage to said transistor amplifier;
    said frequency selective output connected to said control electrode of said electron control device; and
    means including said electron control device connected to said transistor amplifier whereby said first voltage output will be passed through said transistor amplifier only when said input signal being within a predetermined frequency band.
12. A signal-receiving device as in claim 11 wherein said electron control device controls a base voltage of said transistor amplifier, said electron control device being arranged to gate on the said transistor amplifier only when said input signal-receiving circuit receives a signal within the predetermined frequency.

References Cited
UNITED STATES PATENTS

| | | | |
|---|---|---|---|
| 3,038,089 | 6/1962 | Kittrell et al. | 307—88.5 |
| 3,159,753 | 12/1964 | Anderson et al. | 307—88.5 |
| 3,211,928 | 10/1965 | Baron et al. | 307—88.5 |
| 3,271,689 | 9/1966 | Hodder | 307—88.5 |

ARTHUR GAUSS, *Primary Examiner.*

DAVID J. GALVIN, *Examiner.*

D. D. FORRER, *Assistant Examiner.*